(12) United States Patent
Tremblay

(10) Patent No.: US 10,222,575 B2
(45) Date of Patent: Mar. 5, 2019

(54) LENS HEATER TO MAINTAIN THERMAL EQUILIBRIUM IN AN INFRARED IMAGING SYSTEM

(71) Applicant: FLIR Systems, Inc., Wilsonville, OR (US)

(72) Inventor: Marcel Tremblay, Goleta, CA (US)

(73) Assignee: FLIR Systems, Inc., Wilsonville, OR (US)

( * ) Notice: Subject to any disclaimer, the term of this patent is extended or adjusted under 35 U.S.C. 154(b) by 290 days.

(21) Appl. No.: 15/017,233

(22) Filed: Feb. 5, 2016

(65) Prior Publication Data

US 2016/0231527 A1 Aug. 11, 2016

Related U.S. Application Data

(60) Provisional application No. 62/113,311, filed on Feb. 6, 2015.

(51) Int. Cl.
| | |
|---|---|
| G02B 7/02 | (2006.01) |
| G01J 5/02 | (2006.01) |
| G01J 5/08 | (2006.01) |
| G01J 5/04 | (2006.01) |
| G01J 5/06 | (2006.01) |
| G01J 5/12 | (2006.01) |
| G02B 13/14 | (2006.01) |
| H04N 5/225 | (2006.01) |
| H04N 5/232 | (2006.01) |
| H04N 5/33 | (2006.01) |
| G01J 5/00 | (2006.01) |
| H04N 5/12 | (2006.01) |

(52) U.S. Cl.
CPC ............ *G02B 7/028* (2013.01); *G01J 5/0205* (2013.01); *G01J 5/041* (2013.01); *G01J 5/061* (2013.01); *G01J 5/12* (2013.01); *G02B 13/14* (2013.01); *H04N 5/2252* (2013.01); *H04N 5/23296* (2013.01); *H04N 5/33* (2013.01); *G01J 5/0846* (2013.01); *G01J 2005/0077* (2013.01); *G01J 2005/068* (2013.01)

(58) Field of Classification Search
None
See application file for complete search history.

(56) References Cited

U.S. PATENT DOCUMENTS

| | | | |
|---|---|---|---|
| 7,612,799 B1* | 11/2009 | Frank | H04N 5/33 |
| | | | 250/330 |
| 2003/0091089 A1* | 5/2003 | Krausse | G02B 7/008 |
| | | | 374/16 |

(Continued)

*Primary Examiner* — Dakshesh D Parikh
(74) *Attorney, Agent, or Firm* — Haynes and Boone, LLP

(57) ABSTRACT

Various embodiments of the present disclosure may include a device having a housing and a lens element configured to pass thermal radiation received from an external environment. The lens element may be an outer surface of the housing exposed to the external environment through an aperture in the housing. The device may also include a focal plane array within the housing and configured to receive the thermal radiation passed by the lens element. The device may further include a heater in thermal contact with the lens element and a controller configured to selectively operate the heater to maintain the lens element within a desired temperature range.

19 Claims, 15 Drawing Sheets

(56) References Cited

U.S. PATENT DOCUMENTS

| | | | | |
|---|---|---|---|---|
| 2007/0198138 A1* | 8/2007 | Wernersson | ............ | G03B 9/10 |
| | | | | 701/1 |
| 2012/0170119 A1* | 7/2012 | Chu | ...................... | G03B 17/55 |
| | | | | 359/512 |
| 2012/0212806 A1* | 8/2012 | Shibata | ............. | H04N 5/23212 |
| | | | | 359/356 |
| 2015/0094703 A1* | 4/2015 | Zikorus | ................. | A61B 18/04 |
| | | | | 606/27 |

\* cited by examiner

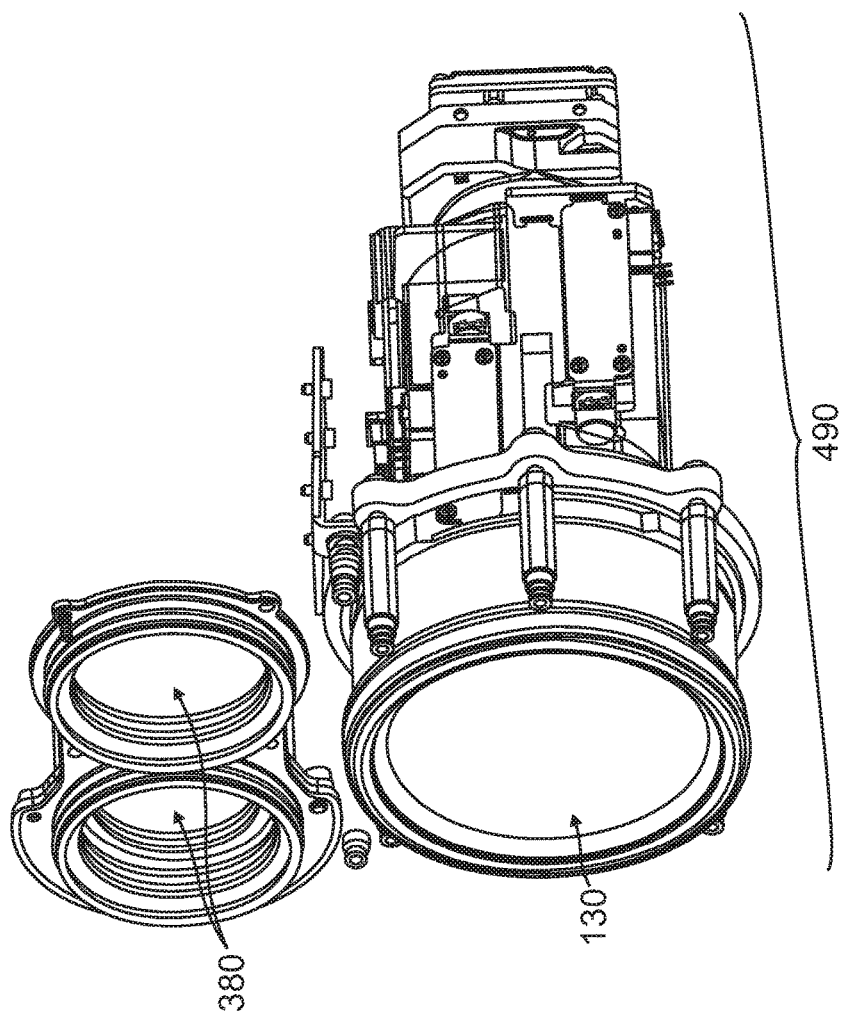

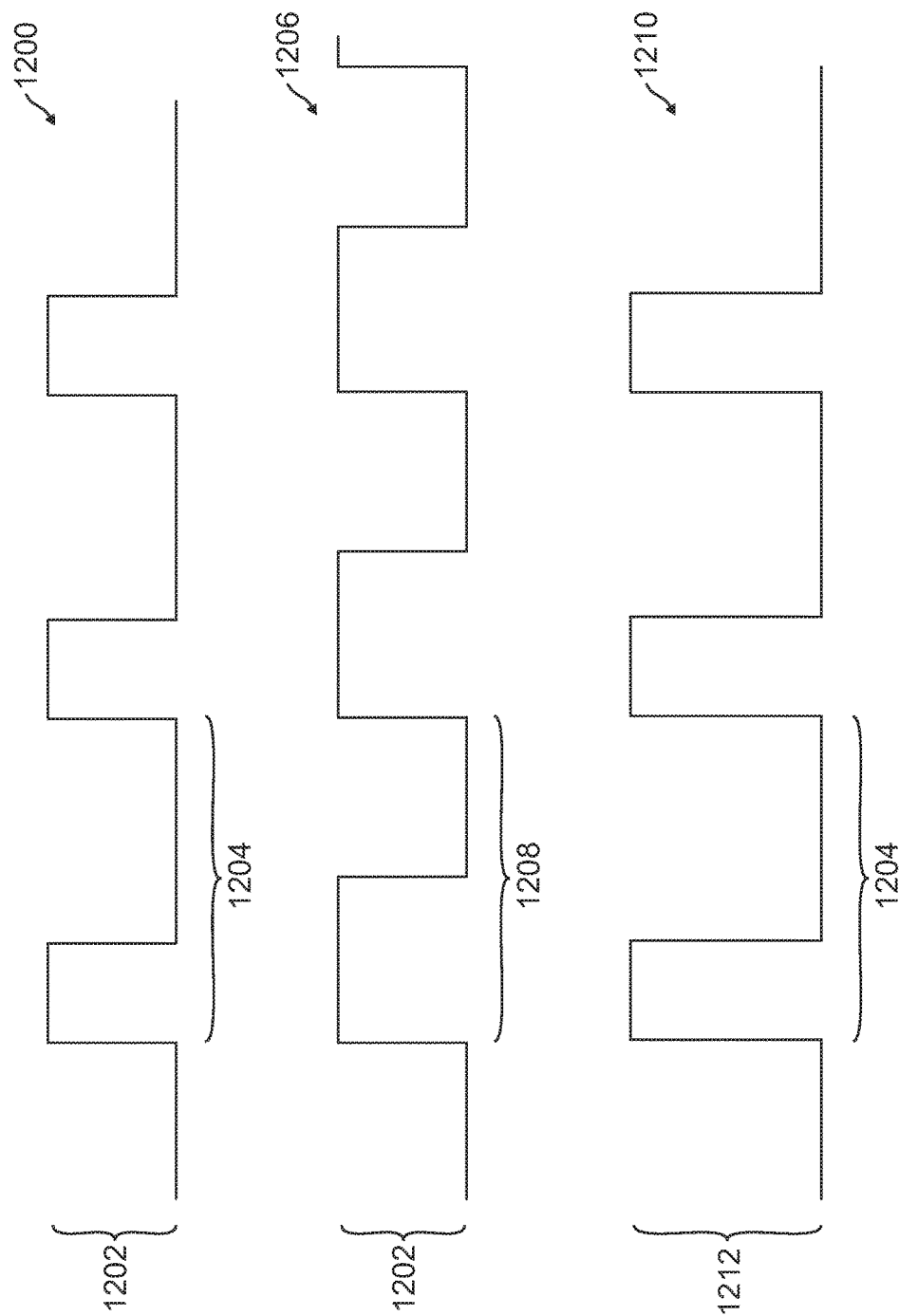

LENS HEATER TO MAINTAIN THERMAL EQUILIBRIUM IN AN INFRARED IMAGING SYSTEM

CROSS-REFERENCE TO RELATED APPLICATIONS

This application claims priority to and the benefit of U.S. Provisional Patent Application No. 62/113,311 filed Feb. 6, 2015 and entitled "LENS HEATER TO MAINTAIN THERMAL EQUILIBRIUM IN AN INFRARED IMAGING SYSTEM" which is hereby incorporated by reference in its entirety.

TECHNICAL FIELD

One or more embodiments of the invention relate generally to infrared imaging devices and more particularly, for example, to maintain the lens element of an infrared imaging device within a desired temperature range.

BACKGROUND

Conventionally, lenses of an imaging device used to provide optical features the device may be contained within a body of the device so that they are maintained within a thermal equilibrium. In order to do so, the lenses are normally self-contained within the body, where the body utilizes an exterior window out of focus to the lenses to provide protection from an external environment. Utilizing the exterior window may allow the device to keep the lenses at a uniform temperature. However, additional lens elements (e.g., the window) that allow radiation causes degradation in the light transmission, resulting in poorer images. The device may utilize one of the in focus lens element, but the in focus lens element must be kept at a known temperature.

SUMMARY

In some embodiments, an infrared imaging device may include a focal plane array and one or more lens elements together in a housing (e.g., a body of an infrared imaging system) and having backend electronics to receive and process thermal image data. For example, a wafer-level packaged (WLP) or pixel-level packaged (PLP) infrared sensor assembly may constitute one or a plurality of infrared sensors constituting the focal plane array and at least one lens element to pass thermal radiation received by the focal plane array. The lens element(s) may make up a zoom feature of the device in certain embodiments. The focal plane array and lens element(s) may be included within a housing, where one lens element may make up an outer surface of the house so that the lens element is exposed to the external environment (e.g., through an aperture in the housing).

In some embodiments, the housing may include a heater for the lens element exposed to the external environment and a controller for the heater. The heater may be in thermal contact with the lens element so as to provide de-fogging and de-icing capabilities to the lens element. The controller may be utilized to selectively operate the heater, such that the heater is maintained in a desired temperature range. In this regard, the housing may include a first temperature sensor (e.g., a thermistor or other temperature detecting device) that may detect a temperature of the lens element exposed to the external environment. The housing may also include a second temperature sensor that may detect an internal temperature of the infrared imaging device, such as a temperature of another lens element of the infrared imaging device (e.g., a rear lens element and/or lens element of the zoom feature of the infrared imaging device). Thus, the desired temperature range may be a temperature difference between the lens element exposed to the external environment and the internal temperature of the infrared imaging device (e.g., no more than 2 degrees different).

In order to supply heat to the lens element exposed to the external environment, the controller may choose to selectively operate the heater, such as when the temperature of the lens element is outside of the desired temperature range. In order to operate the heater, the controller may provide a pulse width modulation signal to the heater, for example, in response to the lens element's temperature being outside the desired temperature range. Pulse width modulation of the signal provided to the heater may allow for control of the power supplied to the heater so that the temperature of the lens element exposed to the external environment may be closely monitored and controlled. As the lens element begins to de-ice and/or heat, the controller may adjust a duty cycle of the pulse width modulation signal, for example, in response to a change in the temperature of the lens element, environment, and/or internal infrared imaging device temperature.

In one embodiment, a device comprises a housing and a lens element configured to pass thermal radiation received from an external environment, wherein the lens element comprises an outer surface exposed to the external environment through an aperture in the housing. The device further comprises a focal plane array within the housing and configured to receive the thermal radiation passed by the lens element, a heater in thermal contact with the lens element, and a controller configured to selectively operate the heater to maintain the lens element within a desired temperature range.

In another embodiment, a method comprises receiving, at a lens element, thermal radiation from an external environment, wherein the lens element comprises an outer surface exposed to the external environment through an aperture in a housing of a device. The method further comprises passing the thermal radiation from the lens element to a focal plane array within the housing, and selectively operating a heater to maintain the lens element within a desired temperature range.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 6A-C illustrate several components of the system of FIG. 3, according to embodiments.

FIG. 12 illustrates three (3) diagrams of a pulse width modulation signal utilized to control a heater applied to a lens element, according to an embodiment.

Embodiments of the invention and their advantages are best understood by referring to the detailed description that follows. It should be appreciated that like reference numerals are used to identify like elements illustrated in one or more of the figures.

DETAILED DESCRIPTION

Figure 1:
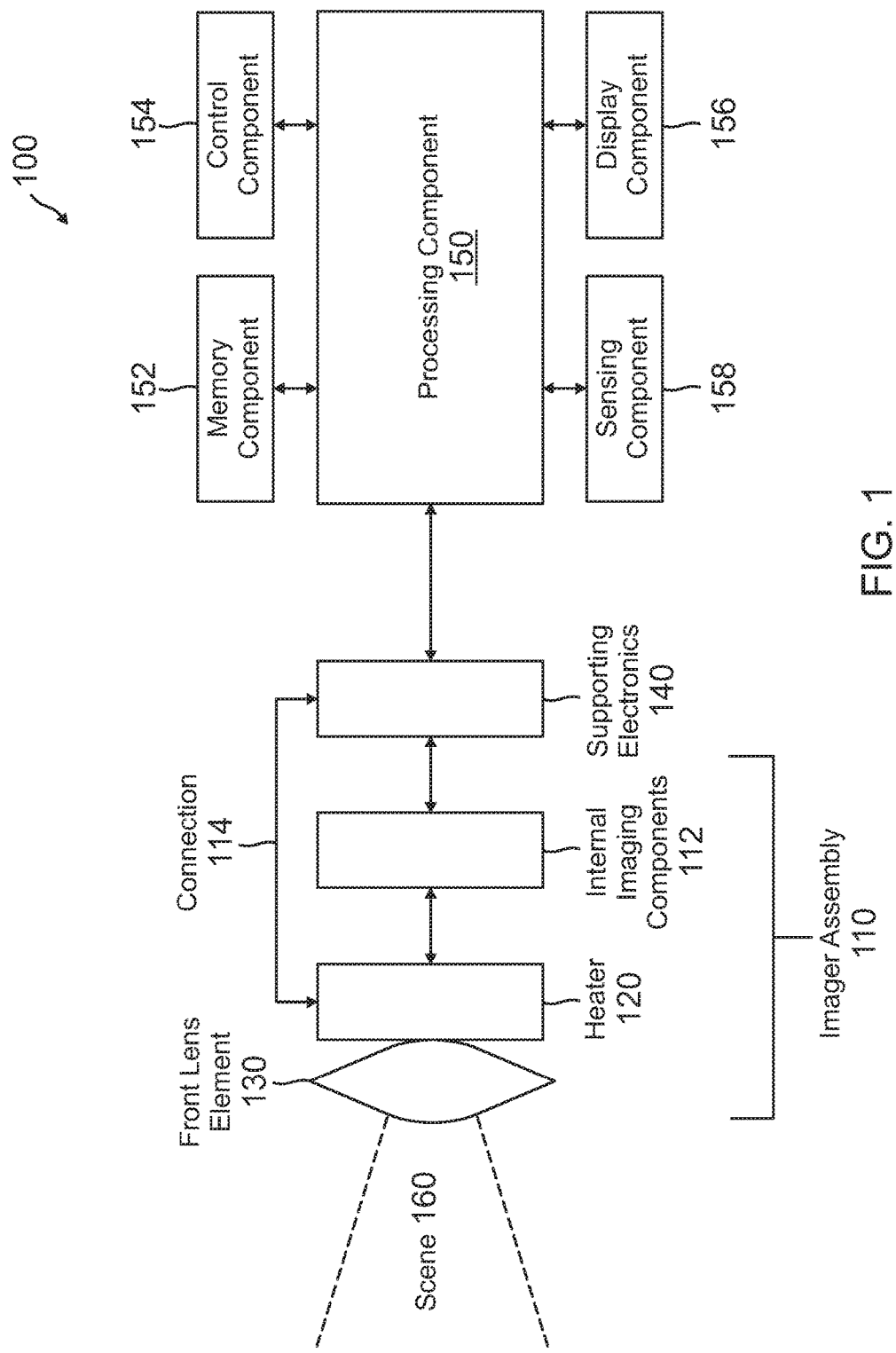
FIG. 1 illustrates a block diagram of an infrared imaging system, according to an embodiment.

FIG. 1 shows a block diagram of a system 100 (e.g., an infrared imaging device or infrared camera) for infrared image capturing and processing in accordance with an embodiment. The system 100 comprises, in one implementation, an imager assembly 110, a processing component 150, a memory component 152, a control component 154, and a display component 156. In some embodiments, the system 100 may include supporting electronics 140 and a sensing component 158.

The system 100 may represent an infrared imaging system, such as an infrared camera and processing electronics, configured to capture and process thermal images, such as image and video images of a scene 160. The system 100 may represent any type of infrared camera adapted to detect infrared radiation and provide representative data and information (e.g., thermal infrared image data of a scene). For example, the system 100 may represent an infrared camera that is directed to the near, middle, and/or far infrared spectrums. In another example, the infrared image data may comprise non-uniform data (e.g., real image data that is not from a shutter or black body) of the scene 160, for processing. The system 100 may comprise a portable device and may be incorporated, e.g., into a vehicle (e.g., an automobile or other type of land-based vehicle, a watercraft, an aircraft, or a spacecraft) or a non-mobile installation requiring infrared images to be stored and/or displayed.

In various embodiments, the system 100 comprises an imager assembly 110 configured to capture infrared image data. In this respect, the imager assembly 110 comprises, in one embodiment, one or more infrared sensors included within internal imaging components 112 (e.g., any type of multi-pixel infrared detector, such as a focal plane array) for capturing infrared image data (e.g., still image data and/or video data) representative of an image, such as the scene 160. The imager assembly 110 includes a front lens element 130 exposed to an external environment, which allows thermal radiation to pass from the scene 160 and be received by the internal imaging components 112. The front lens element 130 makes up a lens element of the imager assembly, and may be constructed of a material, such as germanium, such that the index of refraction for the front lens element 130 varies with temperature. The front lens element 130 may therefore correspond to a zoom lens and be included as a part of a zoom system so that focus of the thermal radiation passing through the front lens element 130 is important for the focus of the resulting thermal image data and to prevent degradation of the thermal radiation. In order to providing heating to the front lens element 130 exposed to the external environment, the imager assembly 110 further include a heater 120 for the lens element, as will be explained in more detail herein. A controller configured to selectively operate the heater 120 may be included (See FIG. 2). The controller and/or the supporting electronics 140 may be coupled to the heater 120 for the front lens element utilize a connection 114, which may provide a pulse width modulation signal in order to control the heater 120. The internal imaging components 112 may further include additional zoom lenses, as well as temperature sensors for the front lens element 130 and/or the additional zoom lenses, in order to provide various optical abilities and/or options to the system 100, including zoom, resolution, focus, temperature sensing, heating or other optical function.

System 100 may include processing electronics configured to receive, process, transmit, and/or record thermal image data received from the sensor assembly (e.g., the focal plane array). In one aspect, the infrared image data (e.g., infrared video data) may comprise non-uniform data (e.g., real image data) of an image, such as scene 160. The processing component 150 may be adapted to process the infrared image data (e.g., to provide processed image data), store the infrared image data in the memory component 152, and/or retrieve stored infrared image data from the memory component 152. For example, the processing component 150 may be adapted to process infrared image data stored in the memory component 152 and provide processed image data and information (e.g., captured and/or processed infrared image data).

In various embodiments, the processing component 150 comprises a processor, such as one or more of a microprocessor, a single-core processor, a multi-core processor, a microcontroller, a logic device (e.g., a programmable logic device (PLD) configured to perform processing functions), a digital signal processing (DSP) device, or other processing device. The processing component 150 may be adapted to interface and communicate with the components 140, 152, 154, 156, and/or 158 to perform method and processing steps and/or operations, as described herein. In one aspect, the processing component 150 may be adapted to perform various other image processes including noise reduction and scaling the infrared image data.

In order to further receive, process, and transmit infrared image data, the system 100 may include the supporting electronics 140. The supporting electronics 140 may be configured to provide additional processing of infrared image data, including adjustment of infrared imaging device temperature and capture temperature range (e.g., temperature and capture temperature of the imager assembly 110), gain, resolution, and/or adjustment of the optics 124. The processing component 150 and the supporting electronics 140 may access and manipulate the optics 124 to provide various features to the system 100. Processes, implemented, for example, by software instructions, may be accessed by the processing component 150 and/or the supporting electronics 140 to provide such features.

It should be appreciated that various processes may be integrated in software and/or hardware as part of the processing component 150, with code (e.g., software or configuration data) stored, for example, in the memory component 152. Embodiments of the software and/or processes, as disclosed herein, may also be stored by a separate computer-readable medium (e.g., a memory, such as a hard drive, a compact disk, a digital video disk, or a flash memory) to be executed by a computer (e.g., a logic or processor-based system) to perform various methods and operations disclosed herein. In one aspect, the computer-readable medium may be portable and/or located separate from the system 100, with the processes and software provided to the system 100 by coupling the computer-readable medium to the system 100 and/or by the system 100 downloading (e.g., via a wired link and/or a wireless link) the processes and software from the computer-readable medium.

The memory component 152 comprises, in one embodiment, one or more memory devices adapted to store data and information, including infrared image data and information (e.g., metadata for the infrared image data). The memory device 120 may comprise one or more various types of memory devices including volatile and non-volatile memory devices, such as RAM (Random Access Memory), ROM (Read-Only Memory), EEPROM (Electrically-Erasable Read-Only Memory), flash memory, or other storage device/mechanism. The processing component 150 may be adapted to execute software stored in the memory component 152 so as to perform method and process steps and/or operations described herein.

The control component 154 comprises, in one embodiment, a user input and/or interface device, such as a rotatable knob (e.g., potentiometer), push buttons, slide bar, keyboard, or other input/output device, that is adapted to generate a user input control signal. The processing component 150 may be adapted to sense control input signals from a user via the control component 154 and respond to any sensed control input signals received therefrom. The processing component 150 may be adapted to interpret such a control input signal as a value, as generally understood by one skilled in the art.

In one embodiment, the control component 154 may comprise a control unit (e.g., a wired or wireless handheld control unit) having push buttons adapted to interface with a user and receive user input control values. In one implementation, the push buttons of the control unit may be used to control various functions of the system 100, such as autofocus, menu enable and selection, field of view, brightness, contrast, noise filtering, high pass filtering, low pass filtering, and/or various other features as understood by one skilled in the art. The control component 154 may further be configured to access and manipulate the internal imaging components 112 and/or the supporting electronics 140 and to provide the aforementioned functions, such as zoom features and/or heating, de-fogging, or de-icing of the front lens element 130, as requested by the user.

The display component 156 comprises, in one embodiment, an image display device (e.g., a liquid crystal display (LCD)) or various other types of generally known video displays or monitors. The processing component 150 may be adapted to display image data and information on the display component 156. The processing component 150 may be adapted to retrieve image data and information from the memory component 152 and display any retrieved image data and information on the display component 156. The display component 156 may comprise display electronics, which may be utilized by the processing component 150 to display image data and information (e.g., infrared images). The display component 156 may be adapted to receive image data and information directly from the image capture component 130 via the processing component 150, or the image data and information may be transferred from the memory component 152 via the processing component 150.

The sensing component 158 comprises, in one embodiment, one or more sensors of various types, depending on the application or implementation requirements, as would be understood by one skilled in the art. The sensors of the sensing component 158 provide data and/or information to at least the processing component 150. In one aspect, the processing component 150 may be adapted to communicate with the sensing component 158 (e.g., by receiving sensor information from the sensing component 158) and with the imager assembly 110 (e.g., by receiving data and information from the imager assembly 110 and providing and/or receiving command, control, and/or other information to and/or from one or more other components of the system 100).

In various implementations, the sensing component 158 may provide information regarding environmental conditions, such as outside temperature, lighting conditions (e.g., day, night, dusk, and/or dawn), humidity level, specific weather conditions (e.g., sun, rain, and/or snow), distance (e.g., laser rangefinder), ambient temperature readings, wind chill or other temperature factors, and/or whether a tunnel or other type of enclosure has been entered or exited. The sensing component 158 may represent conventional sensors as generally known by one skilled in the art for monitoring various conditions (e.g., environmental conditions) that may have an effect (e.g., on the image appearance) on the data provided by the imager assembly 110. Such information may be utilized with the heater 120 to provide heating to the front lens element 130 as necessary for the system 100. However, in other embodiments, one or more of the aforementioned sensors or sensor features may be included within imager assembly 110 (e.g., a temperature sensor, such as a thermistor and/or a controller for heater 120).

In some implementations, the sensing component 158 (e.g., one or more of sensors) may comprise devices that relay information to the processing component 150 via wired and/or wireless communication. For example, the sensing component 158 may be adapted to receive information from a satellite, through a local broadcast (e.g., radio frequency (RF)) transmission, through a mobile or cellular network and/or through information beacons in an infrastructure (e.g., a transportation or highway information beacon infrastructure), or various other wired and/or wireless techniques.

In various embodiments, components of the system 100 may be combined and/or implemented or not, as desired or depending on the application or requirements, with the system 100 representing various functional blocks of a related system. In one example, the processing component 150 may be combined with the imager assembly, the support electronics 122, the optics 124, the memory component 152, the display component 156, and/or the sensing component 158. In another example, the processing component 150 may be combined with the imager assembly 110 with only certain functions of the processing component 150 performed by circuitry (e.g., a processor, a microprocessor, a logic device, and/or a microcontroller) within the imager assembly 110. Furthermore, various components of the system 100 may be remote from each other (e.g., the supporting electronics 140 may comprise a remote sensor with processing component 150 representing a computer that may or may not be in communication with the imager assembly 110).

Figure 2:
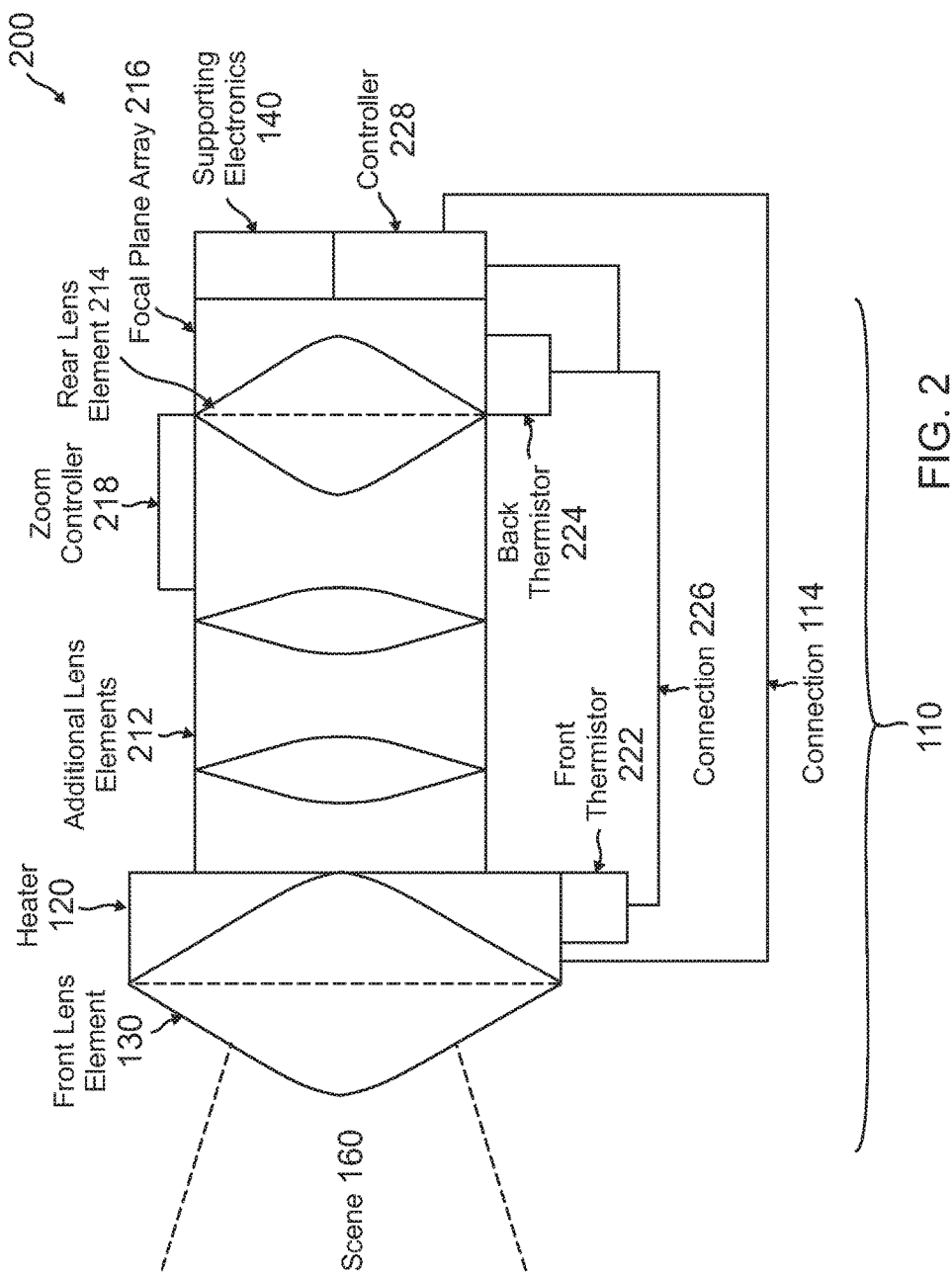
FIG. 2 illustrates additional feature of the system of FIG. 1, according to an embodiment.

FIG. 2 illustrates additional feature of the system of FIG. 1, according to an embodiment. FIG. 2 includes the imager assembly 110 of FIG. 1 as shown expanded into various parts. The imager assembly 110 is further shown with supporting electronics 140, which may be utilized to provide processing of received thermal image data by imager assembly 110. Additionally, the internal imaging components 112 discussed in FIG. 1 are collectively represented as additional lens elements 212, rear lens element 214, focal plane array 216, zoom controller 218, front thermistor 222, back thermistor 224, a connection 226, a connection 114, and a controller 228 (e.g., provided as part of or separate from the supporting electronics 140 in various embodiments). In other embodiments, more or less components may be used to implement imager assembly 110.

The imager assembly 110 may include a focal plane array 216, which may include a plurality of infrared detectors implemented in an array or other fashion on a substrate configured to accept the focal plane array 216. The infrared detectors may be configured to detect incoming infrared radiation (e.g., infrared energy) from scene 160 including, for example, mid wave infrared wave bands (MWIR), long wave infrared wave bands (LWIR), and/or other thermal imaging bands as may be desired in particular embodiments. The infrared detectors may be implemented, for example, as infrared photodetectors, bolometer/microbolometers, or other types of thermal imaging infrared detectors arranged in any desired array pattern to provide a plurality of pixels.

Supporting electronics 140 may connect to the focal plane array 216 and receive, process, and/or transmit thermal image data captured by the focal plane array 216. In this regard, the supporting electronics 140 may calibrate the focal plane array 216 in order to receive and provide interpretable (e.g., readable) thermal still and/or video images. Thus, the supporting electronics 140 may adjust the focal plane array 216 so that received thermal radiation by the focal plane array 216 can be collected to form an image of a scene. In some embodiments, the supporting electronics 140 include a field-programmable gate array that may include an integrated circuit containing the hardware and software logic to perform the aforementioned operations. The supporting electronics 140 may also include additional electronics and logic that may integrate imager assembly 110 into a device package.

As previously stated, the focal plane array 216 may comprise one or more infrared detectors configured as infrared sensors for capturing infrared image data (e.g., still image data and/or video data) representative of an image, such as scene 160. In one implementation, the infrared detectors of the focal plane array 216 provide for representing (e.g., converting) the captured thermal image radiation as digital data (e.g., via an analog-to-digital converter included as part of the imager assembly 110 or separate from the imager assembly as part of the system 100, e.g., supporting electronics 140). Thus, as previously discussed, the infrared image data (e.g., infrared video data) may comprise non-uniform data (e.g., real image data) of an image, such as scene 160. The processing component 110 of FIG. 1 may be adapted to process the infrared image data (e.g., to provide processed image data), store the infrared image data in the memory component 152 of FIG. 1, and/or retrieve stored infrared image data from the memory component 152, as previously discussed.

The infrared radiation detected by the focal plane array 216 may be passed to the focal plane array 216 through one or more lens elements. In this regard, the lens elements may include the front lens element 130, the additional lens elements 212, and the rear lens element 214. However, in other embodiments where additional lens elements are not required for zoom and/or focus, the device in system 200 may include only the front lens element 130, or the front lens element 130 and the rear lens element 214. The front lens element 130, the additional lens elements 212, and the rear lens element 214 may each be configured to pass thermal radiation received from an external source, such as scene 160 and be received by the focal plane array 216. Additionally, the front lens element 130, the additional lens elements 212, and the rear lens element 214 may each provide various optical features, which may be utilized to provide zoom features, focus correction, and/or other features inherent to optical lenses. Such features may be controlled and/or utilized using the zoom controller 218, for example, by the supporting electronics 140 and/or the control component 154 of FIG. 1.

The front lens element 130 of imager assembly 110 may be configured to be located on an external surface of a housing structure of a device. For example, the front lens element 130 may be exposed to an external environment where scene 160 is located through an aperture in the housing. Thus, the front lens element 130 may similarly be exposed to temperature, weather, and/or other environmental conditions inherent to the external environment associated with scene 160. As the front lens element 130 is exposed to the external environment and in contact with the atmosphere, the front lens element 130 may remain approximately the same temperature of the external environment, or noticeably cool due to external forces, such as weather, wind chill, or other environmental factor.

In contrast, the additional lens elements 212 and the rear lens element 214 may be internal to the housing of a device including the component of system 100. As the imager assembly 110 and/or other components of system 100 are utilized, the internal temperature of the imager assembly 110 (as well as the housing enclosing imager assembly 110 in various embodiments) may rise above the ambient environmental temperature around the housing enclosing the system 200, which is in contact with the front lens element 130. As the internal heat of the imager assembly 110 rises, the additional lens elements 212 and/or the rear lens element 214 may not be in approximate thermal equilibrium with the front lens element 130. Thus, focus may be affected as the index of refraction for the front lens element 130, the additional lens elements 212, and/or the rear lens element 214 various based on temperature (e.g., where the front lens element 130, the additional lens elements 212, and the rear lens element 214 are made of a material such as germanium). However, adding another window in front of the front lens element 130 may add another lens element that may degrade transmission of thermal radiation to the focal plane array 216.

System 200 may utilize the heater 120 as part of imager assembly 110 to maintain the front lens element 130 within a desired temperature range. The controller 228 may be utilized to provide a signal to the heater 120 in order to provide heating to the front lens element 130. The signal may be a power signal or may be a control signal for another power source. The signal may be provided through the connection 114, which may control the heater 120. The heater 120 may be in thermal contact with the front lens element 130 to provide heat and thus temperature adjustments to the front lens element 130 (e.g., in various embodiments, heater 120 may transfer heat to the front lens element 130 by directly contacting front lens element 130 or being positioned near the front lens element 130). The desired temperature range may correspond to a temperature range set by controller 228 to provide a known index of refraction for front lens element 130, thereby preventing issues with focus of thermal radiation passed through the front lens element 130 by knowing the current index of refraction of the front lens element 130 while power is supplied to the heater 120. The controller 228 may measure a temperature of the front lens element 130 using a front thermistor 222, which may be connected to the controller 228 using the connection 226. Thus, the front thermistor 222 may provide a temperature signal corresponding to the temperature of the front lens element 130 to the controller 228. In other embodiments, the front thermistor 222 and/or the back thermistor 224 may correspond to other temperature sensing devices, such as thermometers, thermocouples, and/or other types of temperature sensors.

In other embodiments, the desired temperature range may correspond to a desired temperature difference between the front lens element 130 and the internal temperature of imager assembly 110, such as the temperature of the additional lens elements 212 and/or the rear lens element 214. For example, controller 228 may determine it may be advantageous to maintain front lens element 130 within 2 degrees Celsius of the internal temperature of imager assembly 110 (e.g., the temperature of the additional lens elements 212 and/or the rear lens element 214). In order to determine the internal temperature of imager assembly 110 (e.g., the temperature of the additional lens elements 212 and/or the rear lens element 214), a back thermistor 224 may be utilized, which may provide a temperature signal corresponding to the internal temperature of imager assembly 110 (e.g., the temperature of the additional lens elements 212 and/or the rear lens element 214) to controller 228 through connection 226. Additionally, the controller 228 may further set the temperature of the front lens element 130 lower than the internal temperature of imager assembly 110 (e.g., the temperature of the additional lens elements 212 and/or the rear lens element 214) in order to prevent thermal runaway caused by increasing the temperature of the front lens element 130 to the same or higher than the internal temperature.

The heater 120 may also provide de-icing and de-fogging during startup of the device including the components of the system 100. The heater 120 may be constructed of a resistive heating element, however, in other embodiments, other heating sources, processes, or elements may be utilized. The heater 120 may be formed as a ring encircling a perimeter of the front lens element 130 and may be in direct or thermal contact with the front lens element 130. In other embodiments, other constructions of heater 120 may be utilized, such as small resistive cells adjacent to, touching, embedded within, or otherwise in thermal contact with the front lens element 130. The heater 120 may be supplied power through an power source connected to the heater 120, which may be controlled by controller 228.

In some embodiments, the controller 228 may control the heater 120 using a pulse width modulation signal. A pulse width modulation signal alternates between applying the voltage applied to the heater 120 on and off, so that the signal is either supplied at the desired voltage or not supplied. Therefore, pulse width modulation of a signal provides a rectangular wave form with a low value corresponding to lack of applied voltage and a high value correspond to the applied voltage. Thus, the total power supplied to the heater 120 using the pulse width modulation signal depends on the length of time the voltage is applied at the "on" level compared to the "off" level. The term duty cycle refers to the percentage or proportion of the time the pulse width modulated signal spends in the "on" level as compared to the "off" level.

By applying the "on" level for longer portions of the control signal period (e.g., causing a longer/higher duty cycle), the controller 228 may cause more total power to be supplied to the heater 120 and cause quicker and/or hotter temperatures for the heater 120. The controller may also cause slower heating and/or lower temperatures by applying a shorter "on" level and a longer "off" level (e.g., a shorter/lower duty cycle). Thus, the controller 228 may determine the necessary total power to be supplied to the heater 120 using a pulse width modulation signal. During periods of de-icing and/or de-fogging the front lens element 130, the controller may provide for a high duty cycle to provide increased power to the heater 120 and increased heating to the front lens element 130. Conversely, a low duty cycle may be used when the front lens element 130 is close to the desired temperature range, for example, if the ambient temperature in the external environment is only slightly different than the internal temperature or if the front lens element 130 has previously been heated and is approaching the desired temperature range. Moreover, pulse width modulation can further be utilized to generate sine-like waveforms and other waveforms using varying periods instead of a consistent period through the applied power. Additionally, adjustment of the duty cycle may provide for increased heating and/or cooling of the heater 120 and thus the front lens element 130. Thus, the controller 228 may adjust the duty cycle of the applied pulse width modulation signal based on the requirements of the front lens element 130.

Figure 3:
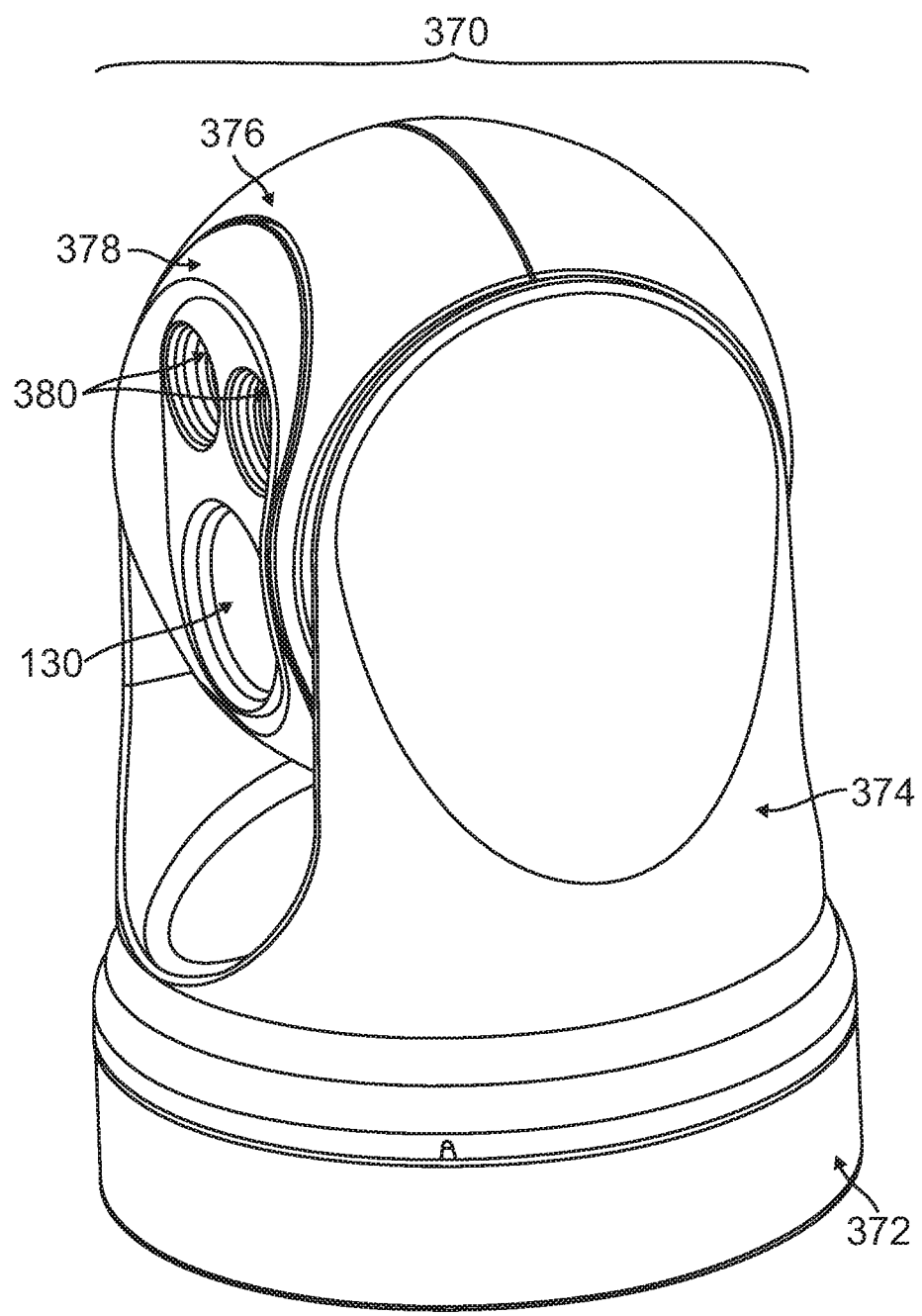
FIG. 3 illustrates an imaging system with a housing showing lens elements exposed to an external environment through apertures in the housing of the device, according to an embodiment.

FIG. 3 illustrates an imaging system 370 that may be implemented with the components of system 100. Imaging system 370 is shown having a mountable base 372, a rotatable body 374, a housing 376, an external face plate 378, the front lens element 130, and camera lenses 380. Camera lenses 380 may be utilized for other imaging devices and/or components, such as visible light imaging devices which may capture still and/or video images. The mountable base 372 may be utilized to mount the imaging system 370 in a location, such as a stationary location and/or a vehicle (e.g., a land vehicle, watercraft, helicopter, airplane, spacecraft, or other vehicle). Once mounted, the rotatable body 374 may be utilized to direct and aim one or more imaging devices, such as the thermal imaging device associated with the front lens element 130. For example, the rotatable body 374 may be utilized to direct the front lens element 130 toward the scene 160 from FIGS. 1 and 2 in order to capture thermal image data of the scene 160.

The housing 376 may provide for an internal housing to protect the sensitive components of the imaging system 370. In this regard, one or more of the sensitive components included in the housing 376 may be constructed and/or connected in a "clean" room or other optimal conditions to prevent environmental and/or atmospheric damage to the focal plane array 216 and associated electronics with the imager assembly 110. The housing 376 further includes an external face plate 378 that may provide for a protective shell that may encapsulate the sensitive components, including the imager assembly 110. The external face plate 378 may include one or more apertures that may allow imaging devices to capture imaging data. Thus, external face plate 378 includes apertures having the external lens element 130 and the camera lenses 380.

Figure 4:
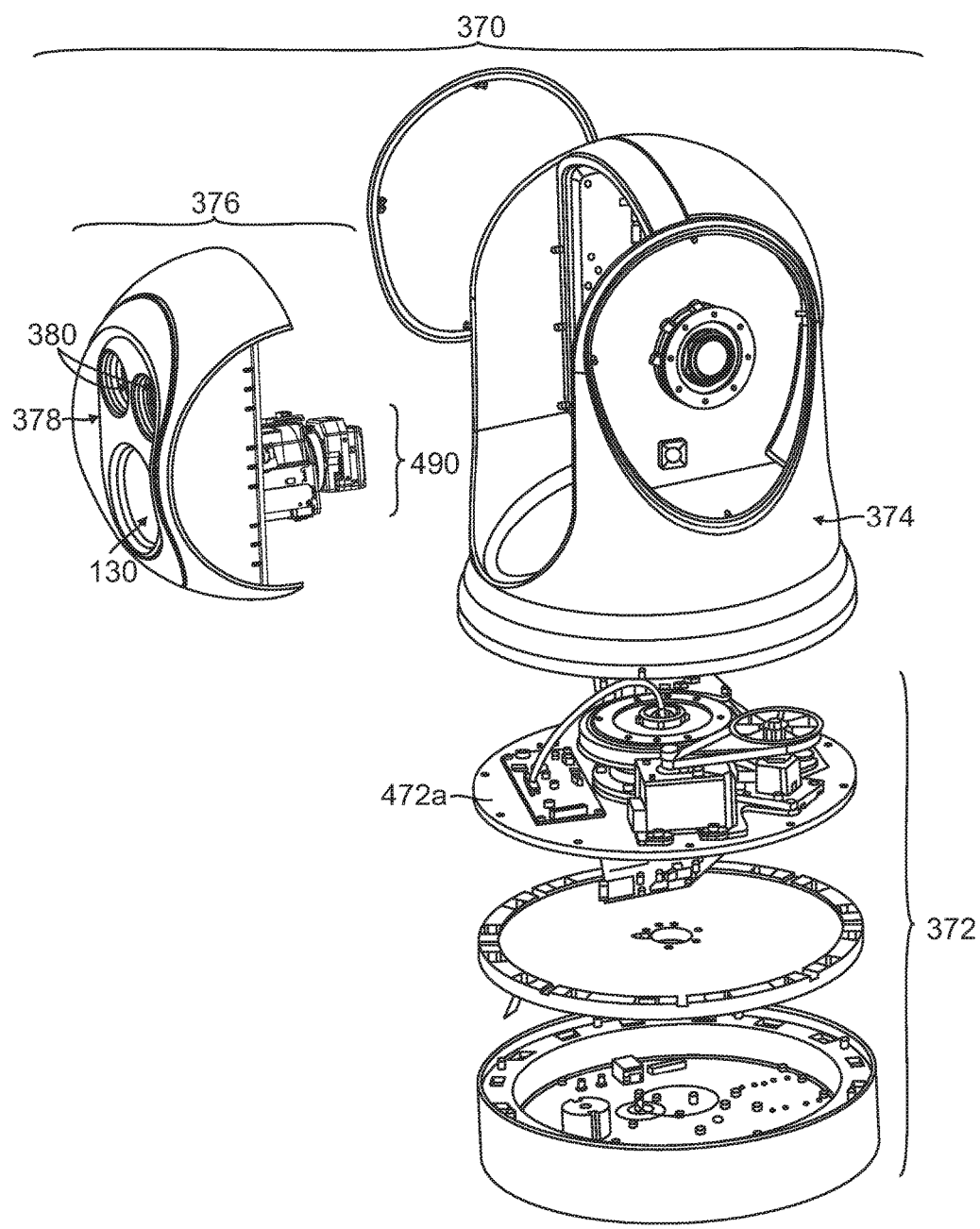
FIG. 4 illustrates an exploded view of the system of FIG. 3 having an internal infrared imaging device and rotatable mechanisms, according to an embodiment.

FIG. 4 illustrates an exploded view of the device of FIG. 3 having an internal infrared imaging device and rotatable mechanisms, according to an embodiment. The imaging system 370 shown in FIG. 3 includes subcomponents utilized for image capturing, such as a thermal imaging device package 490 and imaging system rotation mechanisms 472a. The thermal imaging device package 490 may correspond to some or all of the components of system 100, and may at least include the imager assembly 100 and supporting electronics 140. The thermal imaging device package 490 may also include the controller 228 of system 200. The imaging system 370 of FIG. 3 is shown with subcomponents, such as the mountable base 372, the rotatable body 374, the housing 376, the external face plate 378, the front lens element 130, and the camera lenses 380. The imaging system rotation mechanisms 472a are shown as a component of the mountable base 372 and the rotatable body 374, such that the imaging system rotation mechanisms 472a may be utilized to direct one or more imaging devices of the imaging system 370. Thus, by directing the imaging system rotation mechanisms 472a (e.g., using the control component 154 of FIG. 1), a user utilizing the imaging system 370 may capture thermal imaging data.

In the exploded view of the imaging system 370 shown in FIG. 4, the thermal imaging device package 490 is shown connected to the external face plate 378. The external face plate 378 may connect to the housing 376, which may be attached to the rotatable body 374 to form a seal that may include the thermal imaging device package 490 as an interior component of the imaging system 370. Moreover, once connected, the thermal imaging device package 490 may only be exposed to an external environment through the front lens element 130. Thus, the thermal imaging device package 490 may utilize a heater in order to maintain the front lens element within a desired temperature range.

Figure 5:
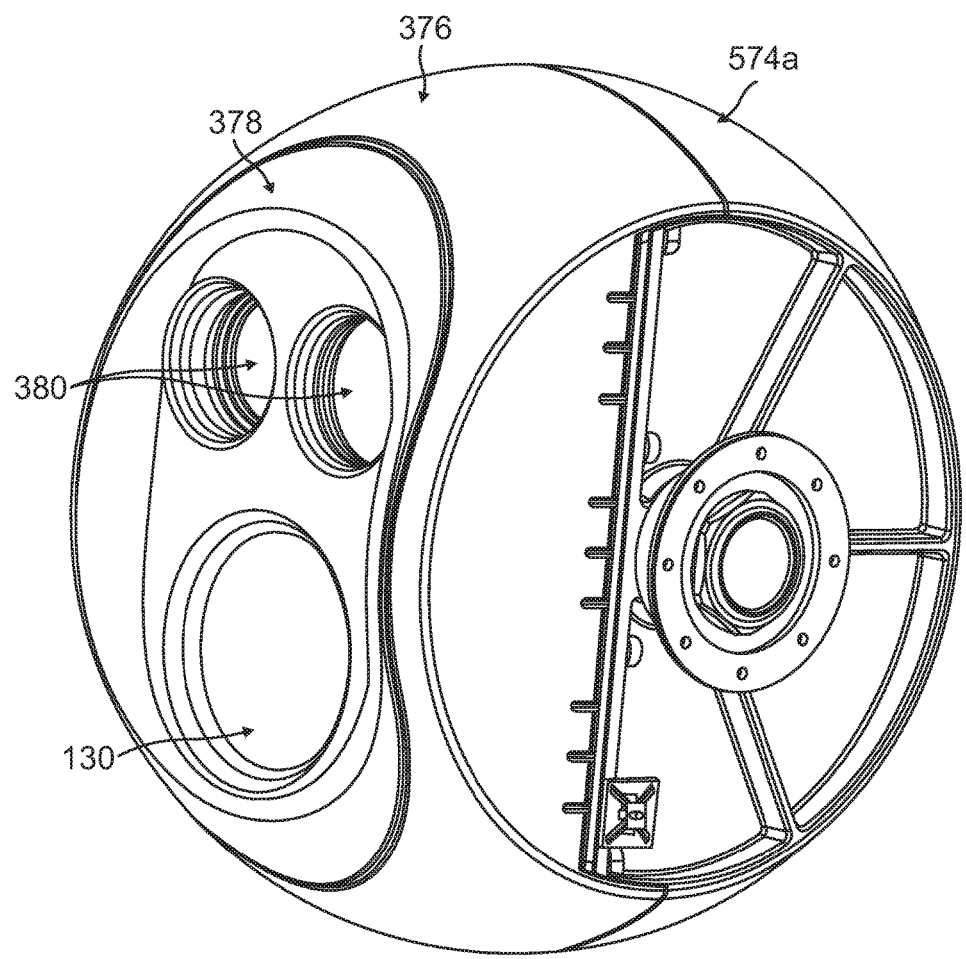
FIG. 5 illustrates the housing of the system of FIG. 3 having apertures for lens elements, according to an embodiment.

FIG. 5 illustrates the housing of the device in FIG. 3 having apertures for lens elements, according to an embodiment. The housing 376 of FIG. 5 is shown with the external face plate 378 connected to the housing 376 and further attached to a portion of the rotatable body 574a in order to encapsulate imaging devices, such as the thermal imaging device package 490 shown in the exploded view of the imaging system 370 of FIG. 4. The external face plate 378 is shown with a closer view of the apertures in the external face plate used to provide windows in the external face plate for the front lens element 130 of a thermal imaging device and the camera lenses 380. In various embodiments, the external face plate 378 may include fewer or additional apertures for additional imaging devices, sensors, or other components of the imaging system 370 of FIG. 3.

Figure 6A:
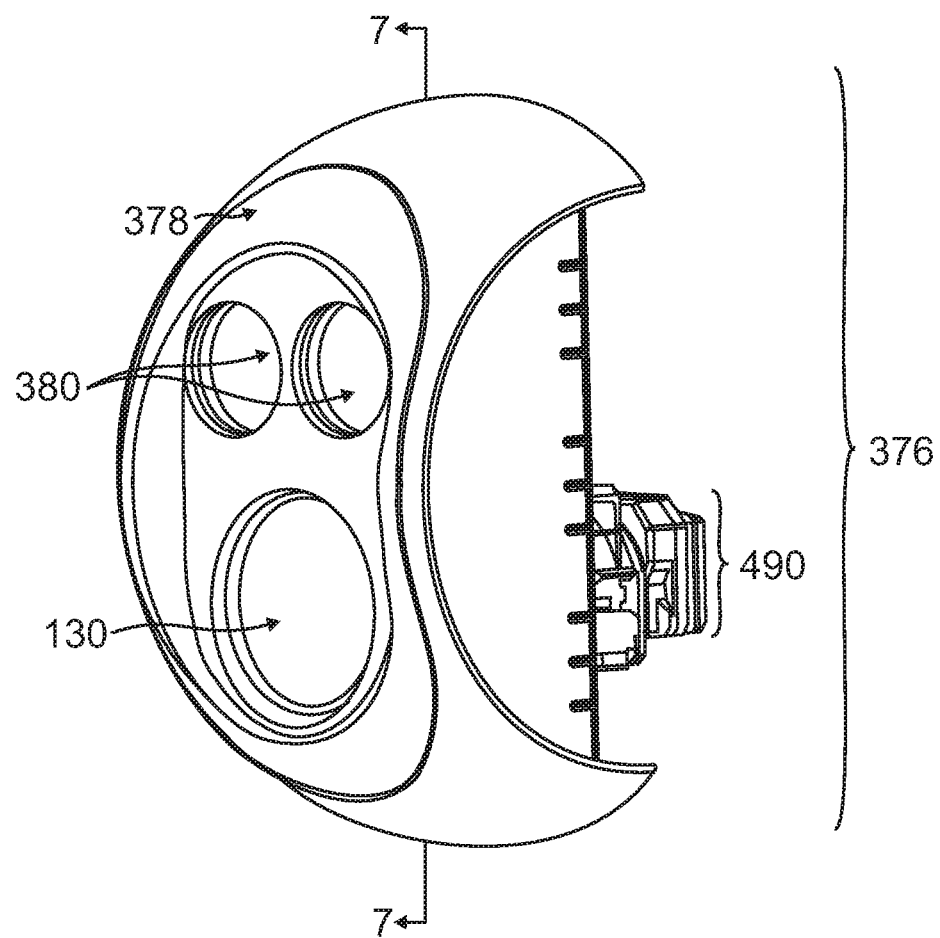

FIG. 6A illustrates a breakdown of the components of the device in FIG. 3, according to an embodiment. FIG. 6A includes the housing 376, shown as a breakaway from the rotatable body 374 of FIG. 3. The housing 376 is shown without the portion of the rotatable body 574a in FIG. 5 in order to display the thermal imaging device package 490 connected to the external face plate 378 and utilizing the front lens element 130 to pass thermal radiation received by a focal plane array of the thermal imaging device package 490. Additionally, the front face plate is shown with the camera lenses 380, which may be utilized to pass visible light, which may be recorded by one or more still or video cameras.

FIG. 6B further illustrates a breakdown of the components of the device in FIG. 3, according to an embodiment. As shown in FIG. 6B, the thermal imaging device package 490 is shown removed from the external face plate 378. The thermal imaging device package 490 may include one or more of the components shown in FIGS. 1 and 2, such as the imager assembly 110 having the front lens element 130. The thermal imaging device package 490 may be mounted into the imaging system 370 of FIGS. 3 and 4 such that the front lens element 130 is mounted to an aperture in the imaging system 370 and exposed to an external environment. The camera lenses 380 may also be mounted to other apertures in the imaging system 370 and may allow for passing of visible light to be received by a still or camera.

Figure 6C:
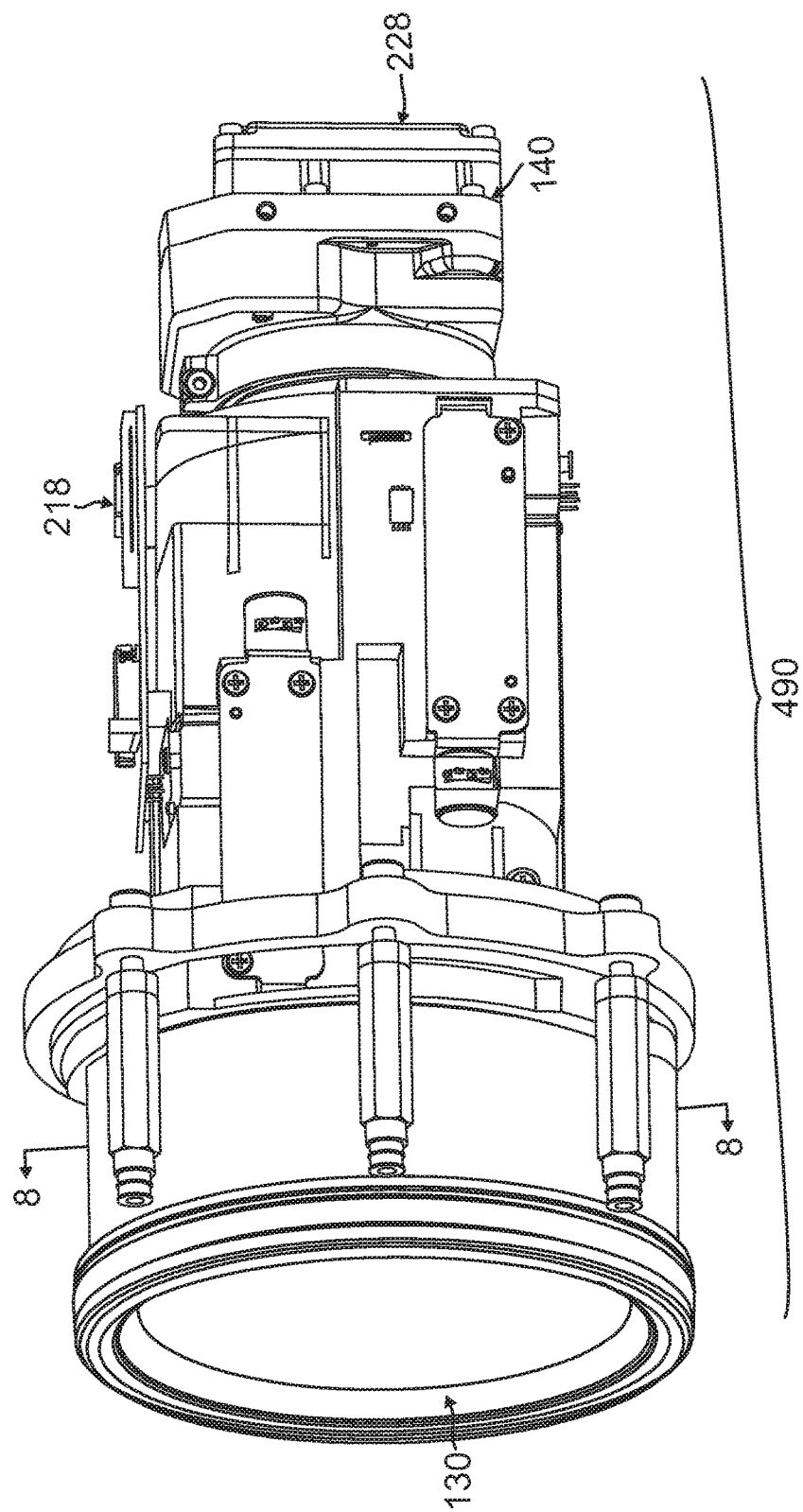

FIG. 6C further illustrates a breakdown of the components of the device in FIG. 3, according to an embodiment. The closer view of the thermal imaging device package 490 in FIG. 6C shown a zoom controller 218 mounted to the top of the thermal imaging device package 490 and utilized to control one or more lens elements to provide a zoom feature for use with thermal imaging provided by the thermal imaging device package 490. Additionally, the thermal imaging device package 490 can be seen with the supporting electronics 140 used to receive thermal imaging data from a focal plane array and process the thermal imaging data, such as by providing a viewable image and/or communicating the thermal imaging data to another processing component. The controller 228 is also shown with the thermal imaging device package 490, which may be utilized provide a signal to a heater for use in applying heat to the front lens element 130.

Figure 7:
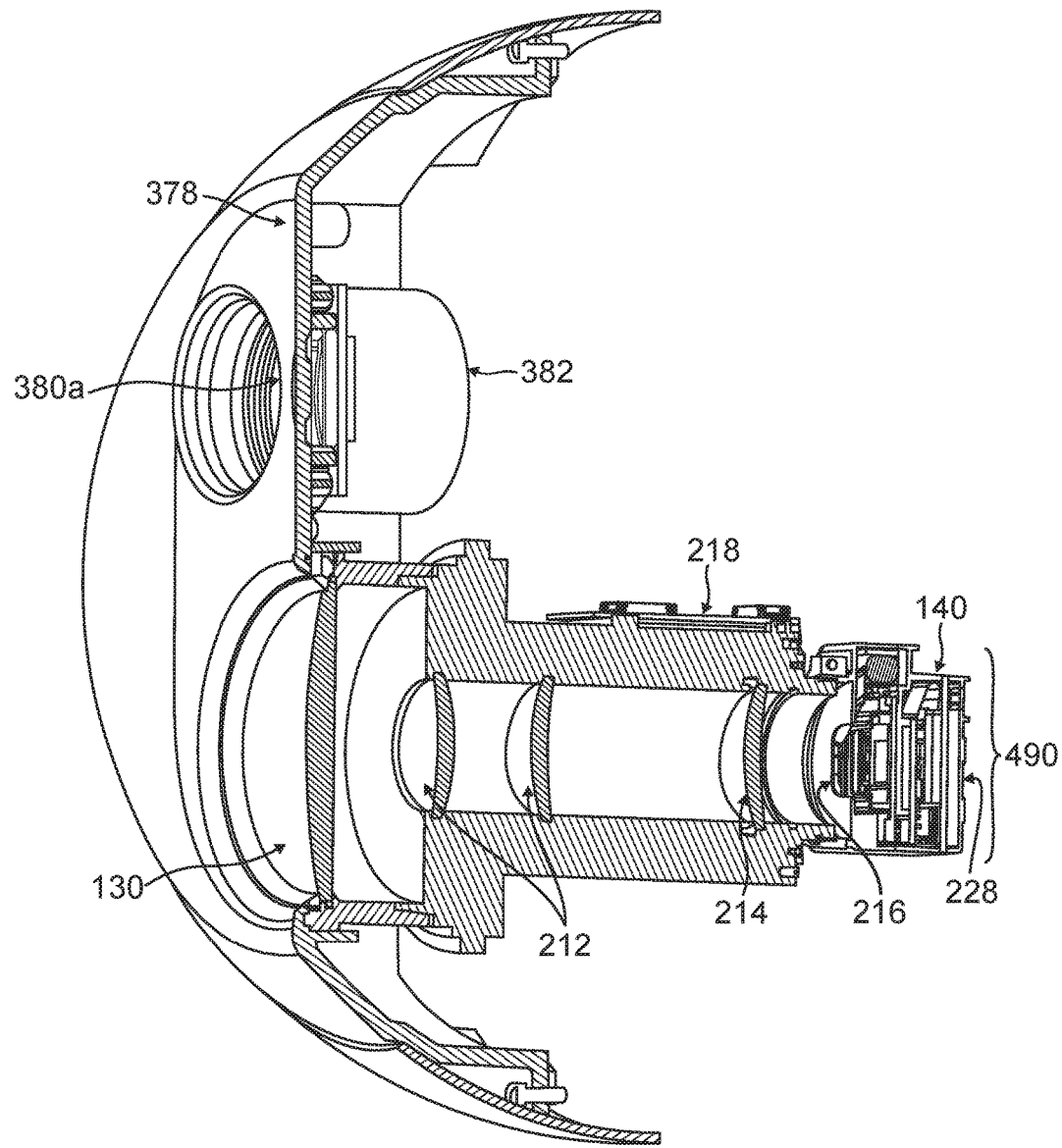
FIG. 7 illustrates a cross section of the components of FIG. 6A taken along line 7-7, according to an embodiment.

FIG. 7 illustrates a cross section of the components of FIG. 6A taken along line 7-7, according to an embodiment. In FIG. 7, the internal components of the thermal imaging device package 490 are shown. The external face plate 378 is shown with an aperture for a camera lens 380a, which may form a front lens of a camera 382, which may capture visible light radiation from a scene and record the radiation to present a visible picture of the scene. Additionally, an aperture is shown with the front lens element 130, which form the external lens element for the thermal imaging device package 490.

The thermal imaging device package 490 further includes internal components, including the additional lens elements 212, which may form internal lens elements of the thermal imaging device package and may assist in providing a zoom feature, and rear lens element 214. The zoom feature may be controlled using a zoom controller 218. The focal plane array 216 is shown behind the rear lens element 214 and may receive thermal radiation and provide thermal image data to the supporting electronics 140. Thus, the front lens element 130, the additional lens elements 212, and the rear lens element 214 may pass thermal radiation to the focal plane array. The front lens element 130, the additional lens elements 212, and the rear lens element 214 may be made of a material, such as germanium, which may have an index of refraction that varies based on the temperature of the front lens element 130, the additional lens elements 212, and the rear lens element 214. Thus, the controller 228 for a heater may further be included with the thermal imaging device package 490. The controller 228 may be utilized to provide heating to the front lens element 130 during startup and/or operation of the thermal imaging device package 490. Thus, the front lens element 130, the additional lens elements 212, and the rear lens element 214 may be maintained in thermal equilibrium by the controller 228 providing power to the heater.

Figure 8:
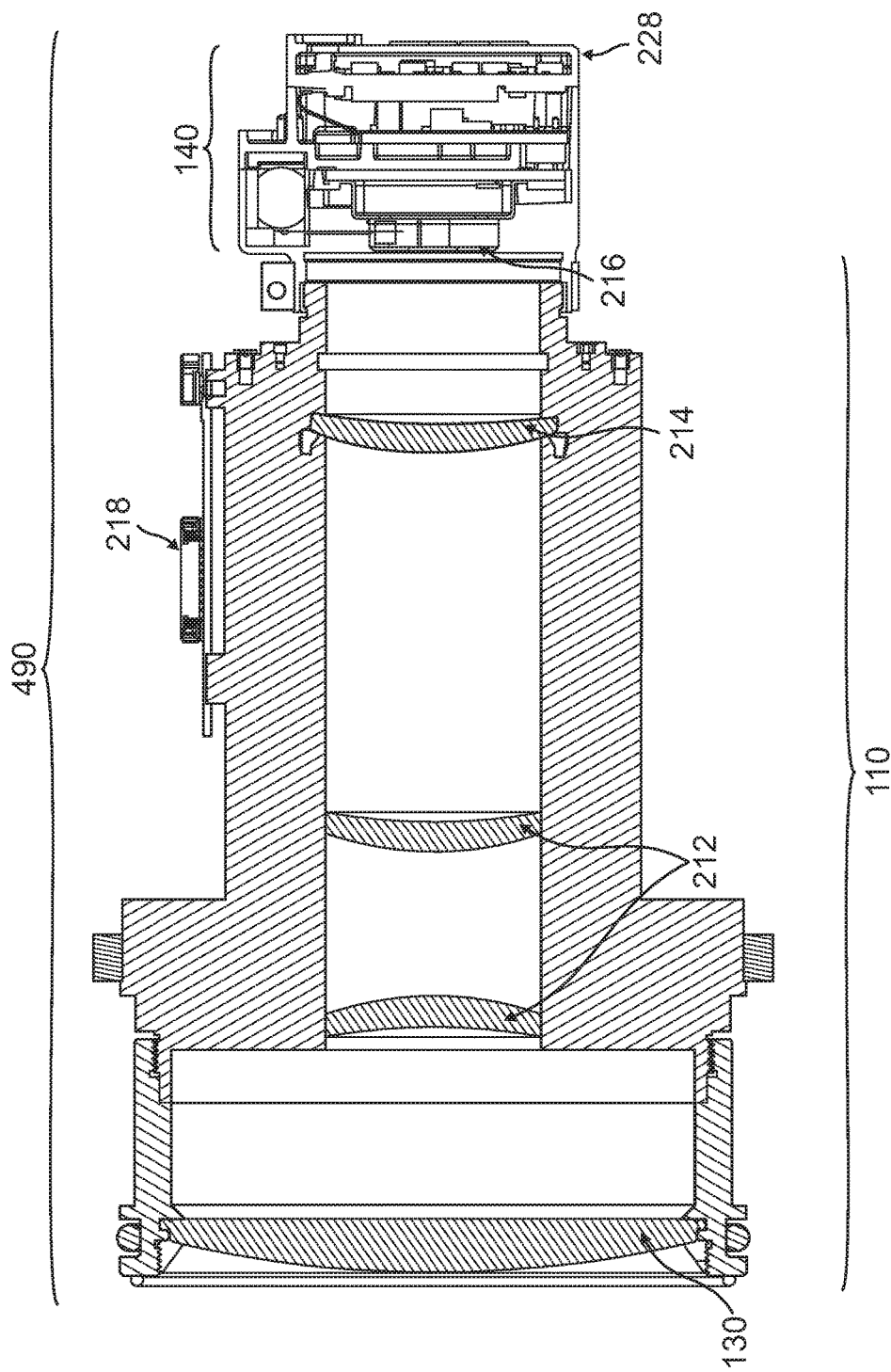
FIG. 8 illustrates a cross section of the components of FIG. 6C taken along line 8-8, according to an embodiment.

FIG. 8 illustrates a cross section of the components of FIG. 6C taken along line 8-8, according to an embodiment. FIG. 8 demonstrates a closer view of the thermal imaging device package 490 shown in the cross section of FIG. 7. The thermal imaging device package 490 includes the imager assembly 110. The imager assembly 110 is shown with components used to capture thermal radiation from a scene. Thus, the imager assembly 110 includes the front lens element 130, the additional lens elements 212, the rear lens element 214, and the focal plane array 216. The imager assembly 110 further includes the zoom controller 218 for use with front lens element 130, the additional lens elements 212, and the rear lens element 214, so as to provide zoom features for the imager assembly 110.

The thermal imaging device package 490 in FIG. 8 further shows the supporting electronics 140 and the controller 228 for a heater. As discussed herein, the controller 228 may selectively operate the heater, such that the heater is used to keep the front lens element within a desired temperature range. The heater may further be used when conditions for the user of the thermal imaging device package 490 prevent capturing of thermal image data, such as if the front lens element 130 requires de-icing or de-frosting. In this regard, a signal may be supplied to the heater by the controller 228. The signal provided by the controller 228 may correspond to a pulse width modulation signal, which may cycle a set voltage of power applied to the heater on and off in order to provide a required total power to the heater. The controller 228 may set the duty cycle necessary to provide the required total power, and may adjust the duty cycle as necessary to provide additional heating and/or cooling of the front lens element. Additionally, the controller 228 may also adjust the peak (applied during the on cycle) voltage and/or the base (applied during the off cycle) in order to adjust the total power applied to the heater.

The required total power may be determined by the controller 228 in order to get and/or maintain the front lens element 130 within the desired temperature range. The desired temperature range may also be a desired range difference between the front lens element 130 and the rear lens element 214 or other internal portion of the imaged assembly 110, such as the additional lens elements. The heater may be used to apply heating even when the ambient external temperature is the same or similar to the internal temperature of the imager assembly 110. For example, a temperature experienced by the front lens element 130 may be lower than the ambient external temperature due to additional factors, such as wind chill or other atmospheric conditions (e.g., rain, snow, fog, etc.). The heater utilized with the front lens element 130 is shown in more detail in FIGS. 9-10.

Figure 9B:
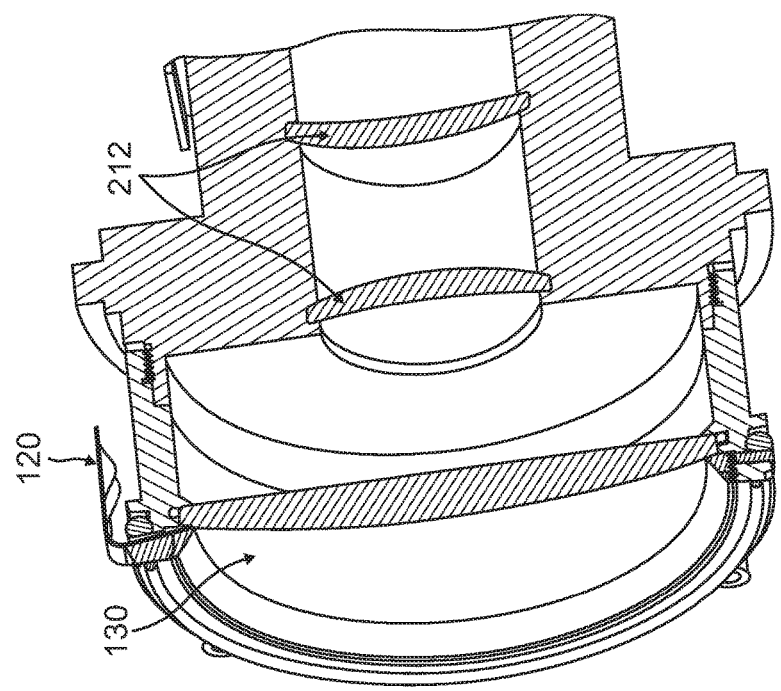
FIGS. 9A and 9B illustrate a lens element exposed to an external environment with a heater for use with the exposed lens element, according to an embodiment.
Figure 9A:
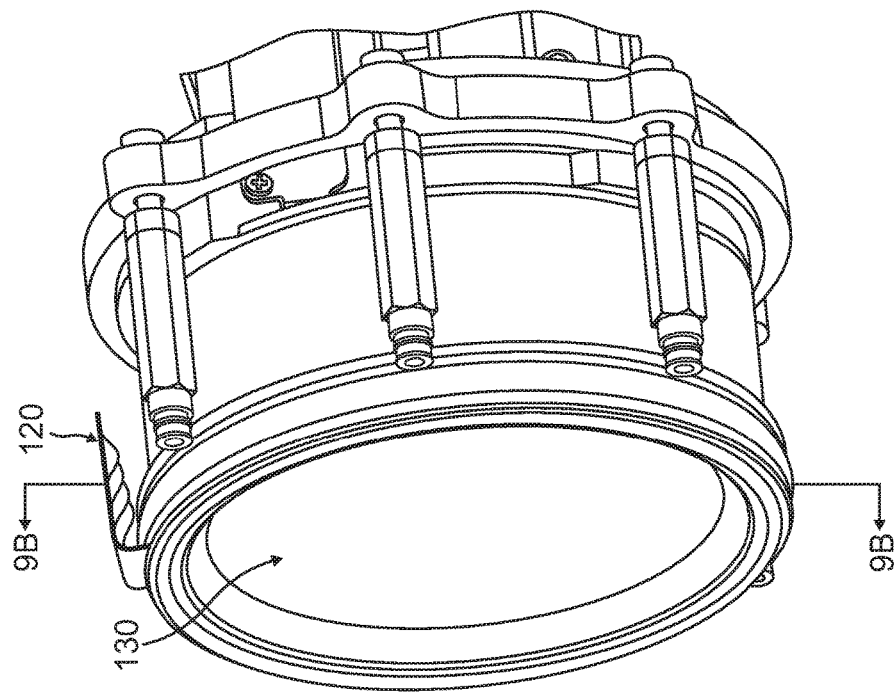

FIG. 9A illustrates a lens element exposed to an external environment with a heater for use with the exposed lens element, according to an embodiment. The front lens element 130 is shown with the heater 120 surrounding a perimeter of the front lens element 130. Additionally, although the heater 120 is shown in contact with the front lens element 130, the heater may also be adjacent to but not touching or otherwise situated to be in thermal contact with the front lens element 130 and providing heating to the front lens element 130. The heater 120 is shown as a solid circle that may provide heat to the front lens element 130 when heated. In other embodiments, the heater 120 may be constructed differently. For example, the heater 120 may include Thus, the heater 120 may correspond to a resistive heating element that may become warm when power is applied to the heater 120. The resistive heating element may be made of resistive ceramics, metal, and/or composites, or may be made of a combination of heating elements and/or heating systems. In other embodiments, the heater 120 may correspond to a different heating system than a resistive heating element, such as a heating system that provides heat through consumption of a heating fuel or utilizing heat radiated from another source to heat the front lens element 130. Although the heater 120 is shown as not encapsulated, covered, and/or protected from the external environment, in various embodiments, the heater 120 may be internal to a package, such as the thermal imaging device package 490 of FIG. 8 and/or the housing 376 or external faceplate 378 of FIGS. 3-5.

FIG. 9B further illustrates a lens element exposed to an external environment with a heater for use with the exposed lens element, according to an embodiment. FIG. 9B shows a cross section of FIG. 9A, which displays the heater 120 encircling a perimeter of the front lens element 130. The heater 130 is shown disposed of in a body a package, such as the thermal imaging device package 490 of FIG. 8. The heater 120 connects to a top portion of the front lens element 130 to provide thermal contact with the front lens element 130. The additional lens elements 212 are shown in the body of the package, such that the heater 130 is sufficiently far to prevent unnecessary heating to the additional lens elements 212. The heater 130 may also supply only enough heat to heat the front lens element 130 and not the additional lens elements 212. For example, the heater 130 may be controlled so that the front lens element 130 remains slightly cooler (e.g., approximately 1-2 degrees Celsius) than the interior of the package and/or the additional lens elements. Maintaining the front lens element 130 cooler than the interior of the package and/or the additional lens elements may prevent thermal run away, which may be present if the front lens element 130 rises above the internal temperature and/or the additional lens elements 212.

Figure 10A:
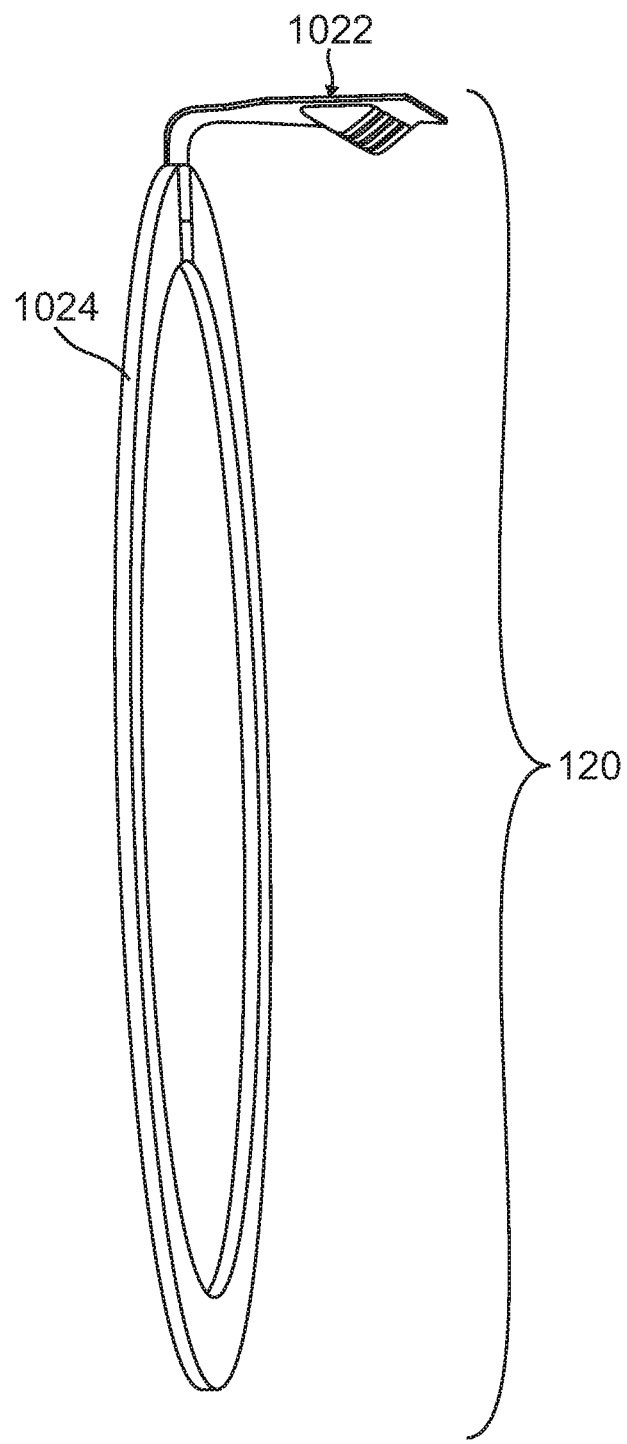
FIG. 10A illustrates different perspectives of a heater for use with a lens element exposed to an external environment, according to an embodiment.

FIG. 10A illustrates a perspective of a heater for use with a lens element exposed to an external environment, according to an embodiment. The heater 120 shown in FIGS. 9 can be seen removed from a package, such as the thermal imaging device package 490 of FIG. 8. The heater is shown with contacts 1022 and a heating element ring 1024. The contacts 1022 may be utilized to connect the heater 120 to a power source, which may provide a pulse width modulation signal to the heater 120 through the contacts 1022. For example, the connection 114 of system 100 and 200 may connect the controller 228 to the heater 120 through contacts 1022. The connection 114 may provide the pulse width modulation signal determined by the controller 228 to the contacts 1022. The pulse width modulation signal may heat the heating element ring 1024, which may then provide heat to a lens element in thermal contact with the heating element ring 1024.

Figure 10B:
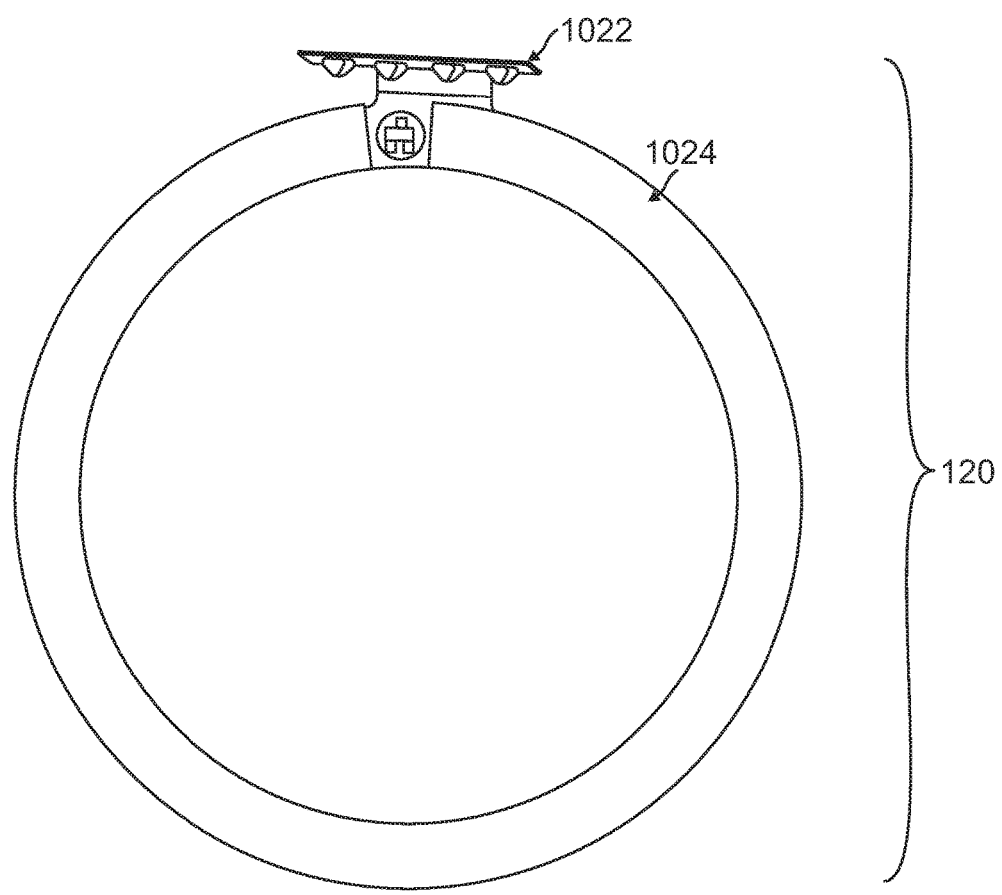
FIG. 10B illustrates a cross section of the components of FIG. 9A taken along line 9-9, according to an embodiment.

FIG. 10B illustrates a different perspective of a heater for use with a lens element exposed to an external environment, according to an embodiment. The contacts 1022 are shown extended from the heater 120 in a direction perpendicular to the heating element ring 1024. The contacts 1022 further include bumps or ridges, which may be utilized to form an electrical connection with a power source and/or controller. The heating element ring 1024 may also be formed in a flat ring, which may provide a surface area that may form a thermal contact with a lens element in order to provide heating to the lens element. Although the heating element ring 1024

Figure 11:
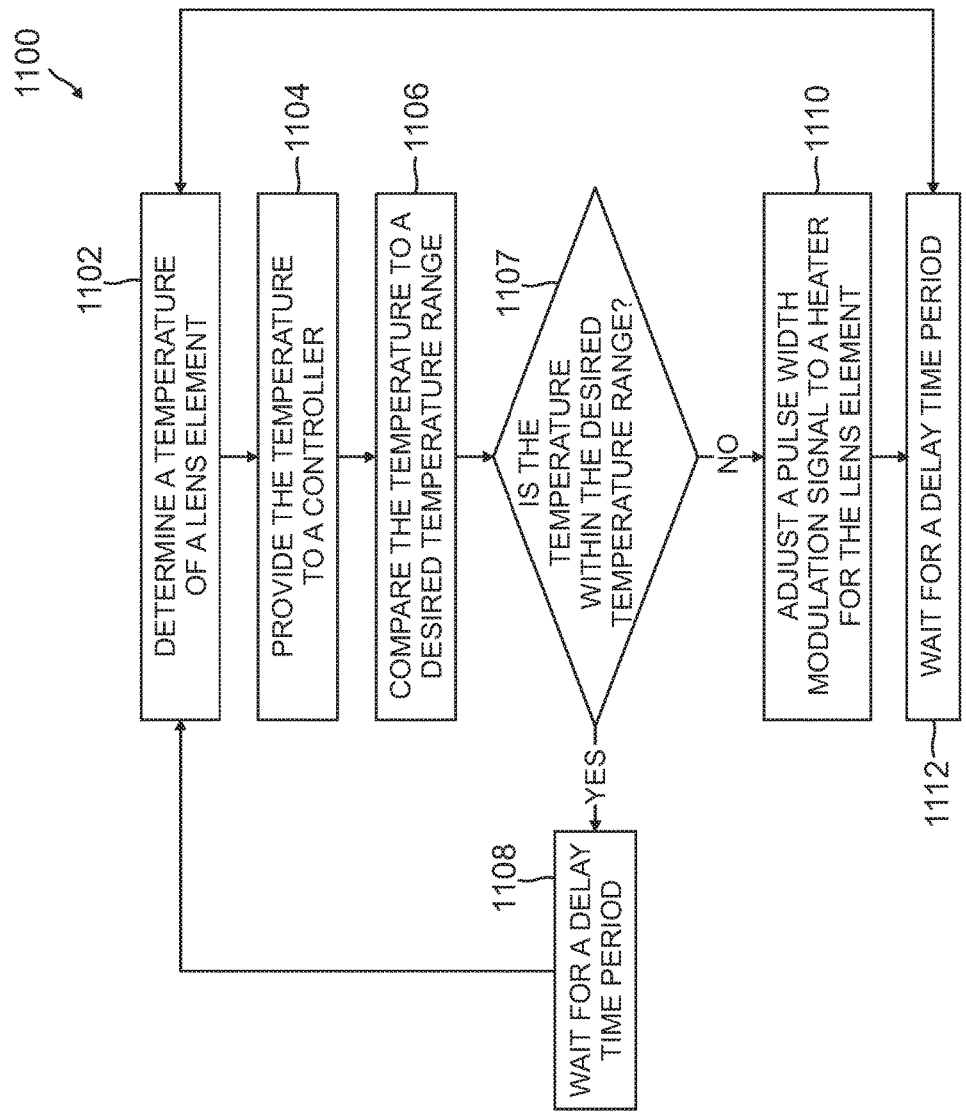
FIG. 11 illustrates a flowchart of a process for heating a lens element exposed to an external environment using a heater and a controller for the heater, according to an embodiment.

FIG. 11 illustrates a flowchart of a process for heating a lens element exposed to an external environment using a heater and a controller for the heater, according to an embodiment. Note that one or more operations, steps, processes, and methods described herein may be omitted, performed in a different sequence, or combined as desired or appropriate.

At block 1102, a temperature of a lens element 130 is determined, for example, using a thermistor 222 or other temperature sensor to measure the temperature of the lens element 130. The lens element 130 may pass thermal radiation received from a scene to one or more additional lens elements 212 and 214 and/or a focal plane array 216. The focal plane array 216 may be configured to receive the thermal radiation passed by the lens element 130 and may be contained within an interior of a housing 376 that makes up a device 370 used for thermal imaging. The device 370 may be a watercraft mountable imaging system that may provide visible and/or thermal imaging systems. The lens element 130 may comprise an outer surface of the housing 376, such that the lens element 130 is exposed to the external environment through an aperture in the housing. The temperature sensor 222 may also be a first temperature sensor of the device that measures the temperature of the lens element 130 exposed to the external environment, where the housing 376 further includes a second temperature sensor 224 that measures a temperature of the interior of the housing 376, such as one or more additional lens elements 212 and 214 (e.g., a rear lens element 214) included inside the housing.

At block 1104, the temperature is provided to a controller 228, which may be included with the device 370 and/or packaged within the housing 376. The temperature sensor 222 used to measure the temperature may be may provide a temperature signal to the controller 338 in response to detecting the temperature of the lens element 130. Where a second temperature sensor 224 further measures the temperature within the housing 376, for example, at a rear lens element 130, the second temperature sensor 222 may provide a second temperature signal to the controller 228. Once the temperature is received by the controller 228, at block 1106, the temperature is compared to a desired temperature range. The desired temperature range may be set as a desired temperature and/or desired range nearby the temperature (e.g., within a range of approximately 2 degrees Celsius at a temperature approximately 20 degrees Celsius above ambient environmental conditions in some embodiments). For example, the index of refraction for a lens made of a certain material may be known at this temperature range. However, other embodiments may utilize a desired range in temperature difference between the lens element 130 and the interior of the housing 376/device 370, for example, the temperature of a rear lens element 214 contained within the housing 376.

If the temperature of the lens element 130 is within the desired temperature range (block 1107), then at block 1108, a delay time period may be utilized before returning to block 1102. In various embodiments, the delay time period may not be utilized or may be negligible so that the temperature of the lens element 130 is constantly measured. However, in some embodiments, the temperature of the lens element 130 may also only be measured at specific intervals using the delay time period. Conversely, if the temperature of the lens element 130 is not within the desired temperature range (block 1107), then at block 1110, a pulse width modulation signal applied to a heater 120 for the lens element 130 may be adjusted. Adjustment of the pulse width modulation signal may correspond to determination of a pulse width modulation signal initially applied to the lens element 130 using the heater in order to heat the lens element 130 the desired temperature range. Moreover, the adjustment may also be an adjustment to a presently applied pulse width modulation signal (e.g., adjustment of a max/min amount of power, duty cycle, and/or period), which may be necessitated when heating the lens element 130 (e.g., for de-icing/de-fogging, as the lens element's temperature nears the desired temperature range, etc.). After adjusting the pulse width modulation signal, a delay time period may be utilized, at block 1112, before the flowchart returns to block 1102 to determine the temperature of the front lens element 130 again. Thus, after heating of the lens element 130 begins, the process may start over in order to determine whether heating was sufficient to heat the lens element 130 to the desired temperature range. In other embodiments, the delay time period may not be utilized.

FIG. 12 illustrates three (3) diagrams of a pulse width modulation signal utilized to control a heater applied to a lens element, according to an embodiment. FIG. 12 includes a first pulse width modulation signal 1200, a second pulse width modulation signal 1206, and a third pulse width modulation signal 1210, which may be utilized to heat the front lens element 130 of system 100 using the heater 120. The first pulse width modulation signal, the second pulse width modulation signal 1206, and the third pulse width modulation signal 1210 may each be applied to the heater 120 using the controller 228, such as through a connection 114 to contacts 1022.

The first pulse width modulation signal 1200 includes amplitude 1202 and a period 1204. As shown in FIG. 12, the duty cycle 1204 includes an "on" level for $3/10$ the period and an "off" level for $7/10$ the period. Thus, the duty cycle 1204 of the first pulse width modulation signal 1200 has a 30% duty cycle 1204. The controller 228 may adjust the first pulse width modulation signal 1200 in two different ways. In a first adjustment, the controller 228 may adjust the duty cycle 1204 of the first pulse width modulation signal 1200, such as by having a longer on level. As shown in the second pulse width modulation signal 1206, the period 1208 of the second pulse width modulation signal 1206 includes an "on" level for $5/10$ of the period and an "off" level for $5/10$ of the period. Thus, the duty cycle 1208 of the second pulse width modulation signal 1206 has a 50% duty cycle 1208. The second pulse width modulation signal 1206 includes the same amplitude 1202. However, with a higher duty cycle 1208, more overall power applied to the heater 120 may cause greater and/or faster heating.

The controller 228 may also adjust the amplitude 1202 of the first pulse width modulation signal 1200. As shown with the third pulse width modulation signal 1210, the duty cycle 1204 remains the same as the first pulse width modulation signal (e.g., 30%). However, amplitude 1212 of the third pulse width modulation signal 1210 is increased so as to apply more power during each "on" level. Thus, the overall power applied to the heater 1200 may be increased when using the third pulse width modulation signal 1210 having the amplitude 1212.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into substeps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A device comprising:
   a housing of the device;
   a lens element coupled to the housing and configured to pass thermal radiation received from an external environment, wherein the lens element comprises an outer surface exposed to the external environment through an aperture in the housing;
   a focal plane array within the housing and configured to receive the thermal radiation passed by the lens element;
   a first temperature sensor configured to provide a first temperature signal based on a temperature of the lens element;
   a second temperature sensor disposed within the housing of the device and configured to provide a second temperature signal based on an internal temperature of the housing of the device;
   a heater in thermal contact with the lens element; and
   a controller configured to selectively operate the heater to maintain the temperature of the lens element within a desired temperature range relative to the internal temperature of the housing of the device based on the first and second temperature signals.

2. The device of claim 1, wherein the controller is configured to:
   provide a pulse width modulation signal to the heater based on the first and second temperature signals; and
   adjust a duty cycle of the pulse width modulation signal based on the first and second temperature signals.

3. The device of claim 1, wherein the desired temperature range is approximately 2 degrees Celsius relative to the internal temperature of the housing of the device.

4. The device of claim 3, wherein the heater comprises a heating element that encircles a perimeter of the lens element, and wherein the controller is configured to selectively operate the heater such that the temperature of the lens element is lower than the internal temperature of the housing of the device.

5. The device of claim 1, wherein the heater comprises a resistive heating element configured to receive a pulse width modulation signal from the controller.

6. The device of claim 1, wherein the device is a watercraft mountable imaging system.

7. A method comprising:
   receiving, at a lens element coupled to a housing of a device, thermal radiation from an external environment, wherein the lens element comprises an outer surface exposed to the external environment through an aperture in the housing of the device;
   passing the thermal radiation from the lens element to a focal plane array within the housing;
   providing a first temperature signal based on a temperature of the lens element;
   providing a second temperature signal based on an internal temperature of the housing of the device; and
   selectively operating a heater to maintain the temperature of the lens element within a desired temperature range relative to the internal temperature of the housing of the device based on the first and second temperature signals.

8. The method of claim 7, wherein the operating comprises providing a pulse width modulation signal to the heater based on the first and second temperature signals.

9. The method of claim 8, wherein the operating comprises adjusting a duty cycle of the pulse width modulation signal based on the first and second temperature signals.

10. The method of claim 7, wherein the desired temperature range is approximately 2 degrees Celsius relative to the internal temperature of the housing of the device.

11. The method of claim 10, wherein the heater comprises a heating element that encircles a perimeter of the lens element, and wherein the operating is performed such that the temperature of the lens element is lower than the internal temperature of the housing of the device.

12. The method of claim 11, wherein the heater comprises a resistive heating element configured to receive a pulse width modulation signal from a controller.

13. The method of claim 7, wherein the device is a watercraft mountable imaging system.

14. The device of claim 1, wherein the lens element is mounted to the aperture in the housing of the device, and wherein the lens element is located on an external surface of the housing of the device.

15. The device of claim 1, further comprising a face plate connected to the housing, wherein the lens element is mounted to an aperture of the face plate.

16. The device of claim 1, wherein the second temperature sensor is coupled to the focal plane array, and wherein the internal temperature of the housing of the device is associated with a temperature of the focal plane array.

17. The device of claim 1, further comprising a lens assembly comprising the lens element and one or more additional lens elements, wherein the second temperature sensor is disposed within the device, and wherein the second temperature signal provided by the second temperature sensor is not associated with the lens element and the one or more additional lens elements.

18. The method of claim 7, wherein the second temperature signal is associated with a temperature of the focal plane array.

19. The method of claim 7, wherein a lens assembly comprises the lens element and one or more additional lens elements, and wherein the second temperature signal is not associated with the lens element and the one or more additional lens elements.

* * * * *